US010594222B2

(12) United States Patent
Weidenbruch et al.

(10) Patent No.: US 10,594,222 B2
(45) Date of Patent: Mar. 17, 2020

(54) SWITCHING POWER SUPPLY

(71) Applicant: Endress+Hauser SE+Co. KG, Maulburg (DE)

(72) Inventors: Simon Weidenbruch, Lörrach (DE); Narcisse Michel Nzitchieu Gadeu, Maulburg (DE); Max Jehle, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/309,626

(22) PCT Filed: May 17, 2017

(86) PCT No.: PCT/EP2017/061870
§ 371 (c)(1),
(2) Date: Dec. 13, 2018

(87) PCT Pub. No.: WO2017/215873
PCT Pub. Date: Dec. 21, 2017

(65) Prior Publication Data
US 2019/0334443 A1  Oct. 31, 2019

(30) Foreign Application Priority Data

Jun. 14, 2016  (DE) .................. 10 2016 110 846

(51) Int. Cl.
*H02M 3/335* (2006.01)
*H02M 1/00* (2006.01)
*H02M 1/32* (2007.01)

(52) U.S. Cl.
CPC .............. *H02M 3/33523* (2013.01); *H02M 2001/0025* (2013.01); *H02M 2001/0048* (2013.01); *H02M 2001/327* (2013.01)

(58) Field of Classification Search
CPC ....... H02M 3/33523; H02M 2001/327; H02M 2001/0025; H02M 2001/0048
See application file for complete search history.

(56) References Cited

U.S. PATENT DOCUMENTS 5,297,014 A * 3/1994 Saito ................. H02M 3/33507
361/111
5,412,555 A * 5/1995 Uramoto ............. H02M 3/3385
363/18

(Continued)

FOREIGN PATENT DOCUMENTS

CN  203590041 U  5/2014
JP     1093130 A  4/1989

(Continued)

OTHER PUBLICATIONS

Search Report for German Patent Application No. 10 2016 110 846.4, German Patent Office, dated May 13, 2017, 5 pp.

(Continued)

*Primary Examiner* — Kyle J Moody
(74) *Attorney, Agent, or Firm* — Mark A. Logan; PatServe

(57) ABSTRACT

Described is an explosion endangered region usable, switching power supply for supplying an output voltage controlled to a desired value, comprising a supply path, which includes a switching controller controlled via a driver, a galvanically isolated transformer connected after the switching controller, and, connected after the transformer, a rectifier-containing, output circuit, and a feedback path, via which the driver is fed a signal transmitted via a light source and a light receiver and reflecting the output voltage, based on which the driver controls the output voltage to the desired value via a corresponding operation of the switching controller. The feedback path includes a voltage regulator, which regulates a supply voltage falling across the light source to a fixed (Continued)

value, and an electrical current regulator, which regulates an electrical current flowing through the light source to an electrical current value corresponding to the output voltage.

14 Claims, 2 Drawing Sheets

(56) References Cited

U.S. PATENT DOCUMENTS

| | | | | |
|---|---|---|---|---|
| 5,633,787 A * | 5/1997 | Song | ............ | H02M 1/32 363/21.07 |
| 6,002,602 A * | 12/1999 | Higuchi | ............ | H02M 3/33523 363/95 |
| 6,122,180 A * | 9/2000 | Seo | ............ | H02M 3/33507 363/21.17 |
| 6,314,004 B1 * | 11/2001 | Higuchi | ............ | H02M 3/33523 363/19 |
| 7,057,907 B2 * | 6/2006 | Oh | ............ | H02M 3/33507 363/21.01 |
| 7,161,783 B2 * | 1/2007 | Yoshida | ............ | H02M 1/32 361/100 |
| 7,394,669 B2 * | 7/2008 | Fahlenkamp | ..... | H02M 3/33523 363/21.15 |
| 8,582,328 B2 * | 11/2013 | Wu | ............ | H02M 3/33523 323/902 |
| 2004/0081409 A1 * | 4/2004 | Ho | ............ | G02B 6/10 385/92 |
| 2004/0208024 A1 * | 10/2004 | Nagano | ............ | H02M 3/33523 363/19 |
| 2009/0185397 A1 | 7/2009 | Forghani-Zadeh et al. | | |
| 2010/0188063 A1 | 7/2010 | Wu et al. | | |
| 2012/0155123 A1 | 6/2012 | Tang et al. | | |
| 2014/0185172 A1 | 7/2014 | Park | | |
| 2016/0141951 A1 | 5/2016 | Mao et al. | | |

FOREIGN PATENT DOCUMENTS

| | | |
|---|---|---|
| JP | 7059341 A | 3/1995 |
| JP | 8191568 A | 7/1996 |
| JP | 2008159909 A | 7/2008 |
| KR | 1020110111865 A | 10/2011 |
| WO | 2015144943 A1 | 10/2015 |

OTHER PUBLICATIONS

Search Report for International Patent Application No. PCT/EP20176/061870, WIPO, dated Jul. 14, 2017, 16 pp.

* cited by examiner

SWITCHING POWER SUPPLY

CROSS-REFERENCE TO RELATED APPLICATIONS

The present application is related to and claims the priority benefit of German Patent Application No. 10 2016 110 846.4, filed on Jun. 14, 2016 and International Patent Application No. PCT/EP2017/061870, filed on May 17, 2017 the entire contents of which are incorporated herein by reference.

TECHNICAL FIELD

The invention relates to a switching power supply for supplying a consumer with an output voltage controlled to a desired value, comprising a supply path, which includes a switching controller controlled via a driver, a galvanically isolated transformer connected after the switching controller, and, connected after the transformer, a rectifier-containing, output circuit, to the output of which the consumer is connectable, and a feedback path, via which the driver is fed a signal transmitted via a light source and a light receiver and reflecting the output voltage, based on which signal the driver controls the output voltage to the desired value via a corresponding operation of the switching controller.

BACKGROUND

Switching power supplies of this type are applied e.g. for supplying electronic devices installed in industrial measurements technology, e.g. electronic devices such as measuring devices, sensors, measuring- and/or control circuits or signal processors, with an output voltage supplied by the switching power supply and controlled to a predetermined, desired value.

Switching power supplies for producing an output voltage controlled to a predetermined, desired value regularly comprise a supply path and a feedback path. The supply path serves to receive the electrical energy supplied to switching power supply on the input side, to convert the electrical energy and to supply it via an output of the switching power supply. The feedback path serves for leading a signal reflecting the output voltage, applied to the output, back to the input side, based on which the output voltage is controlled to the predetermined desired value by means of a control provided on the input side.

There are a large number of applications, in the case of which controlled switching power supplies are applied for supplying consumers in explosion endangered regions. In explosion endangered regions, strict safety specifications rule, which, among other things, have the goal to prevent a spark formation, which in given cases could trigger an explosion. Beyond that, there are allowed in explosion endangered regions, as a rule, only switching power supplies, whose primary side feedable via an external energy source is galvanically isolated from the secondary side supplying the consumer. In the case of controlled switching power supplies, there is, thus, both in the supply path as well as also in the feedback path, in each case, a galvanic isolation, which meets the explosion protection safety specifications ruling at the location of use.

Corresponding safety requirements are to be found e.g. in the standard IEC 60079-11 published by the International Electrotechnical Commission (IEC), version of Jan. 27, 2012. There are e.g. in part 11 specifications for galvanic isolations meeting the isolation requirements of the explosion protection class, intrinsic safety (Ex-i). According to that, an isolation sufficient for this protection class can be effected via a fixed insulation, which for applications in a voltage range up to 60 V DC has to be at least 0.5 mm thick, and in a voltage range up to 230 V AC at least 1 mm thick. Alternatively, also an air gap can be used, which for applications in a voltage range up to 60 V DC has to be at least 3 mm wide, and in a voltage range up to 230 V AC at least 10 mm wide.

For maintaining these specifications, optocouplers with a correspondingly large insulation resistance can be applied in the feedback path. Commercially obtainable optocouplers, which satisfy these requirements, are, however, quite expensive, even in the case of orders at large numbers.

A significantly cost effective alternative is provided by a signal transmitter comprising a light source and a separate light receiver transforming light striking thereon into an electrical variable. Thus, described, for example, in DE 10 2010 012 064 A1, is a discretely constructed signal transmitter, which includes a light source, e.g. an infrared light emitting diode, arranged on one side of a circuit board and sending light through the circuit board that is received then by a light receiver arranged on the other side of the circuit board.

Conventional light sources, such as e.g. infrared light emitting diodes, usable for optical signal transmission must be operated, however, only with a supply voltage, which, as a rule, is significantly lower than output voltages usually required on the outputs of switching power supplies. For reduction of the voltage falling across the light source, the light source can be preceded by an appropriately sized limiting resistance.

Conventional light emitting diodes suitable for optical signal transmission must be operated with a comparatively high electrical current. Thus, infrared light emitting diodes, for example, must be operated with an electrical current in the order of magnitude of up to 50 mA, sometimes even up to 100 mA, in order to transmit sufficient light through a circuit board with a wall thickness sufficient for applications in explosion endangered regions or through an air gap similarly sufficient. That means that a correspondingly large power loss occurs in the limiting resistance. If a 15 volt decrease must occur across the limiting resistance, then there arises in the case of an electrical current in the order of magnitude of 50 mA to 100 mA a power loss in the order of magnitude of 0.75 W to 1.5 W.

If one would apply such an optical signal transmitter in the feedback path of a switching power supply, then the power loss occurring through the limiting resistance would decrease the efficiency of the switching power supply. Moreover, there is the problem that the power loss is converted into heat. In this way, depending on the size of the voltage falling across the limiting resistance and the electrical current required by the light source, temperatures can occur in the region of the limiting resistance, which make use of the signal transmitter impossible in explosion endangered regions.

SUMMARY

It is an object of the invention to provide a cost effectively manufacturable, controlled switching, power supply, which can be applied in explosion endangered regions.

For this, the invention resides in a switching power supply for supplying a consumer with an output voltage controlled to a desired value, comprising a supply path, which includes a switching controller controlled via a driver, a galvanically isolated transformer connected after the switching controller, and, connected after the transformer, a rectifier-containing, output circuit, to the output of which the consumer is connectable, and a feedback path, via which the driver is fed a signal transmitted via a light source and a light receiver and reflecting the output voltage, based on which the driver controls the output voltage to the desired value via a corresponding operation of the switching controller, characterized in that the feedback path includes a voltage regulator, which regulates a supply voltage falling across the light source to a fixed value lying below the desired value, and an electrical current regulator, which regulates an electrical current flowing through the light source to an electrical current value corresponding to the output voltage.

A first further development is characterized in that arranged between the light source and the light receiver is an insulator, especially a circuit board, transparent in the region of the wavelength of the light emitted from the light source.

A preferred embodiment of the first further development provides that the insulator has a wall thickness of greater than or equal to 0.5 mm, at least in its region, through which the light of the light source passes.

A second further development is characterized in that the light source includes a light emitting element, especially a light emitting diode, especially an infrared light emitting diode, whose brightness changes as a function of an electrical current flowing through it, the light receiver includes a light-sensitive element, especially a photo transistor, which converts light striking thereon into an electrical variable corresponding to brightness, and connected to the light receiver is a measurement circuit, which registers the electrical variable, converts the variable into an output voltage reflecting, electrical signal and leads the signal to the driver connected thereto.

A third further development is characterized in that the voltage regulator comprises a buck regulator, especially a synchronous buck regulator.

A fourth further development is characterized in that the voltage regulator is connected input side with a tap of a shunt branch connected in parallel with the output of the switching power supply, which tap lies at the potential of the output voltage, and output side, via the light source and an electrical current path extending through the electrical current regulator, with a tap of the shunt branch connected with a reference potential.

A fifth further development is characterized in that the electrical current regulator includes an input, which is connected to a tap provided in a shunt branch connected in parallel with the output of the switching power supply, especially to a tap arranged between two elements of a voltage divider provided in the shunt branch and dividing the output voltage falling across the shunt branch, and controls an electrical current flowing through the light source and on an electrical current path connected after the light source and extending through the electrical current regulator, to an electrical current value corresponding to the potential lying on the input of the electrical current regulator.

A sixth further development is characterized in that the electrical current regulator comprises a tunable shunt controller, especially a tunable Zener shunt controller.

A seventh further development is characterized in that a snubbing capacitor is provided arranged in a circuit branch connected after the light source and extending in parallel with the electrical current path extending through the electrical current regulator.

An eighth further development is characterized in that the output circuit comprising the rectifier comprises other components, especially a fuse or circuit breaker connected after the rectifier, a circuit element, especially an R-C unit and/or an L-C unit, connected after the rectifier and effecting a smoothing of the rectified voltage, an energy storer connected after the rectifier, especially a buffer capacitor, and/or a high-ohm basic load connected after the rectifier, especially a high-ohm load resistance.

A ninth further development is characterized in that the voltage regulator is embodied as component of a circuit, which comprises an input circuit connected in front of the voltage regulator, an output circuit connected after the voltage regulator, an energy storer, especially a buffer capacitor, connected after the voltage regulator, a fuse or circuit breaker connected in front of the voltage regulator, a fuse or circuit breaker connected after the voltage regulator and/or a voltage limiter connected after the voltage regulator, especially a voltage limiter comprising diodes connected so as to oppose one another, especially Zener diodes and tunnel diodes.

A tenth further development is characterized in that the light source is applied without a limiting resistance connected in front of the light source in the feedback path.

BRIEF DESCRIPTION OF THE DRAWINGS

The invention and other advantages will now be explained in greater detail based on the figures of the drawing, in which an example of an embodiment is shown; equal elements are provided in the figures with equal reference characters. The figures of the drawing show as follows.

DETAILED DESCRIPTION

Figure 1:
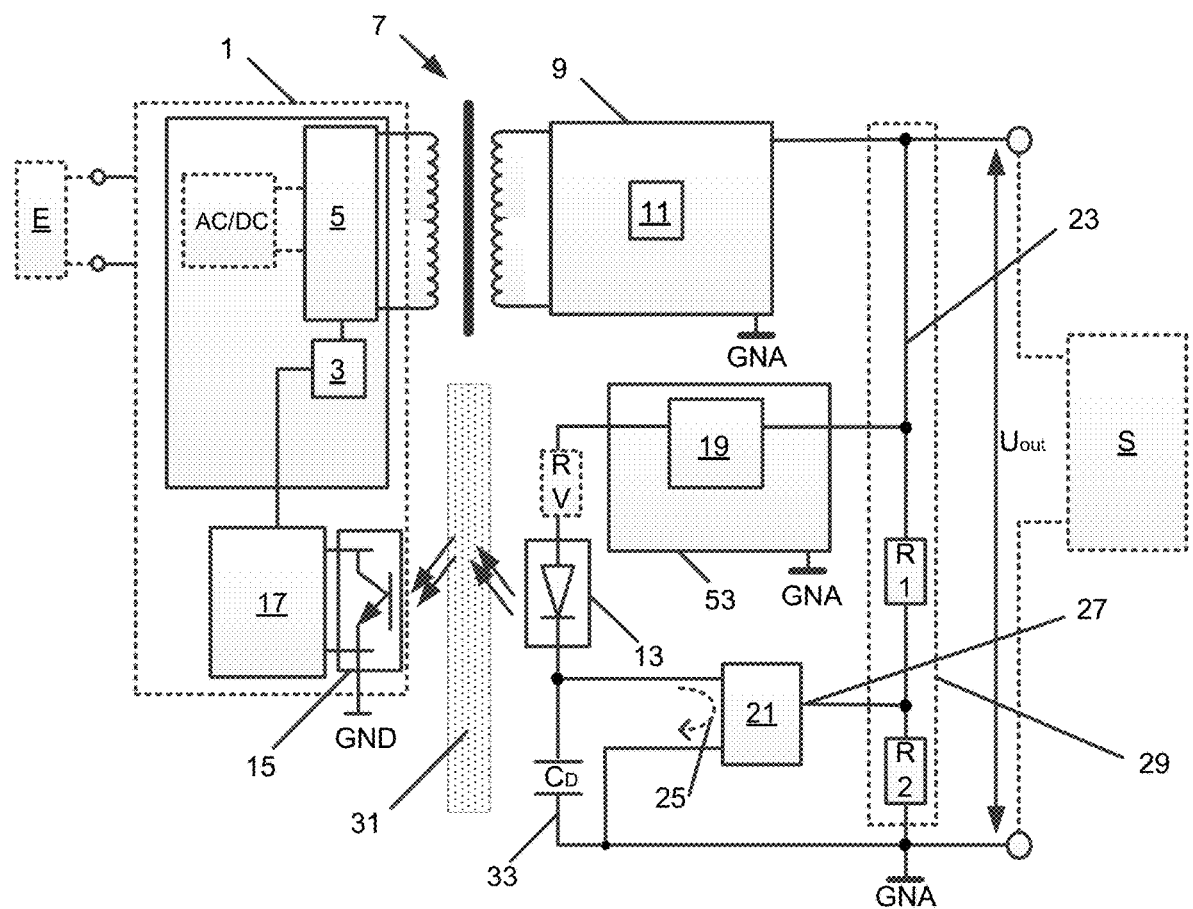
FIG. 1 shows a block diagram of a switching power supply of the invention.

FIG. 1 is a block diagram of a switching power supply of the invention for supplying a consumer S connectable to the output side thereof with an output voltage $U_{out}$ controlled to a desired value Us. The switching power supply includes a primary side and a secondary side galvanically isolated from the primary side. Provided on the primary side is an input circuit 1, to whose input an external energy supply E is connectable. Provided on the secondary side is an output, to which the consumer S is connectable.

The switching power supply includes a galvanically isolated supply path connected on the input side with the input and on the output side with the output of the switching power supply and includes a switching controller 5 provided in the input circuit 1 and controlled via a driver 3, connected after the switching controller 5 a galvanically isolated transformer 7, and connected after the transformer 7, on the output side an output circuit 9 connected with the output, wherein the output circuit 9 comprises a rectifier 11.

To the extent that the switching power supply is supplied via an energy supply E embodied as an alternating voltage source, there is provide supplementally in the input circuit 1 an AC/DC converter connected upstream from the switching controller 5. If the switching power supply is fed via an energy supply E embodied as a direct voltage source, then a converter can still be applied, but, in this case, is not absolutely required.

The switching power supply includes a feedback path, via which the driver 3 is fed a signal transmitted via a light source 13 and a light receiver 15 and reflecting the output voltage $U_{out}$ present on the output of the switching power supply. In such case, the driver 3 is embodied in such a manner that it controls the output voltage $U_{out}$ present on the output based on the signal representing the output voltage $U_{out}$ to the desired value Us predetermined for $U_{out}$ via a corresponding operation of the switching controller 5.

Applied for signal transmission is a light source 13, which includes a light emitting element, whose brightness changes as a function of an electrical current flowing through it. An example for this is conventional light emitting diodes, e.g. infrared light emitting diodes.

The light receiver 15 spatially separated from the light source 13 includes a light-sensitive element that converts light striking thereon into an electrical variable. Suited for this are e.g. phototransistors, which conduct as a function of the brightness of the light striking thereon. The light striking on the light receiver 15 is registered by means of an measurement circuit 17 connected to the light receiver 15 and converted into an electrical signal, which reflects the output voltage $U_{out}$ and which is then fed to the driver 3 connected to the measurement circuit 17.

According to the invention, the feedback path includes a voltage regulator 19 and an electrical current regulator 21. Voltage regulator 19 and electrical current regulator 21 are embodied in such a manner that the voltage regulator 19 controls a feed voltage lying on the light source 13 actively to a fixedly predetermined value lying below the desired value Us predetermined for the output voltage $U_{out}$, while the electrical current regulator 21 sets an electrical current flowing through the light source 13 to an electrical current value corresponding to the output voltage $U_{out}$.

Voltage regulators 19 offer the advantage that they only require a very small rest current, or quiescent current, e.g. a rest current in the order of magnitude of 10 µA to 20 µA, in order to produce for the connected after light source a supply voltage 13, which lies significantly below the output voltage $U_{out}$ lying on the input side thereof. Thus, for example, starting from output voltages $U_{out}$ in the order of magnitude of 4.5 V to 45 V, in low loss manner, supply voltages in the order of magnitude 3 V to 5 V can be produced.

For this, especially well suited voltage regulators 19 include preferably a buck regulator, also known as a step-down converter or buck converter, especially a synchronous buck regulator. An example for this is the buck regulator sold by the firm, Linear Technology, under the product designation LTC3642, which requires only a very small quiescent electrical current in the order of magnitude of 18 µA, in order to convert voltages in the range from 4.5 V to 45 V applied thereto on the input side into voltages output on the output side in the range from 3 V to 5 V. In such case, an electrical current of up to 50 mA can flow through these buck regulators to the light source 13.

Voltage regulator 19 offers the advantage that it reduces the voltage falling across the light source 13 significantly, without being accompanied by a high power loss, which would lead to a local heating of the switching power supply.

In the illustrated example of an embodiment, the voltage regulator 19 is connected to a shunt branch 23 connected in parallel with the output of the switching power supply. The output voltage $U_{out}$ falls across shunt branch 23. In such case, the voltage regulator 19 is connected input side with a tap of the shunt branch 23 lying at the potential $U_{out}$ of the output voltage and output side via the light source 13 and an electrical current path 25 extending through the electrical current regulator 21 with a tap of the shunt branch 23 connected with a reference potential GNA.

The electrical current regulator 21 has an input 27, which is connected to the shunt branch 23 at a tap, which lies at a potential derived from the output voltage $U_{out}$. For this, there is provided in the shunt branch 23 preferably a voltage divider 29, and the tap connected with the input 27 is arranged between the voltage dividing elements, e.g. the here illustrated, series resistances R1, R2.

The electrical current regulator 21 controls the electrical current flowing on the electrical current path through the electrical current regulator 21—and therewith also the electrical current flowing through the light source 13—to an electrical current value corresponding to the potential lying input side on its input 27. For this, especially well suited electrical current regulators 21 comprise preferably adjustable shunt controllers, e.g. zener shunt controllers. An example for this is the electrical current regulator sold by the firm, Texas Instruments, under the product designation, LM431.

In such case, the reduction of the voltage effected via the voltage regulator 19 offers the advantage that because of it also the power loss in the electrical current regulator 21 is correspondingly reduced.

In contrast with the expensive optocouplers used in explosion endangered regions, voltage regulators 19 and electrical current regulators 21 usable in switching power supplies of the invention are significantly more cost effective, mass produced articles, so that switching power supplies of the invention are, in spite of the greater number of components, significantly more cost effectively manufacturable than switching power supplies equipped with optocouplers.

Also, in the case of switching power supplies of the invention, a limiting resistor $R_v$ can be placed in front of the light source 13. This is, however, not absolutely required, due to the voltage reduction effected by the upstream-connected voltage regulator 19, especially also in the case of comparatively high voltages, e.g. voltages of up to 60V. While in the case of signal transmitters known from the state of the art, with light sources supplied via a limiting resistance, regularly a large limiting resistance with a nominal power of greater than or equal to 1 W is required, in switching power supplies of the invention preferably a limiting resistance is completely omitted. Alternatively, a mechanically very small limiting resistance can be used, via which only an accordingly low power loss is present.

Moreover, in switching power supplies of the invention, optionally other components can be provided, especially components improving function and/or operational safety, especially in explosion endangered regions.

An especially preferred form of embodiment provides that there is arranged between the light source 13 and the light receiver 15 an insulator 31, e.g. a circuit board, transparent in the region of the wavelength of the light emitted by the light source 13. The insulator 31 offers the advantage of a marked improvement of the galvanic isolation effected by the signal transmitter. In such case, it is already sufficient, when the insulator 31 has at least in its region passed through by the light of the light source 13 a wall thickness of greater than or equal to 0.5 mm, in order to assure sufficient isolation in explosion endangered regions in the case of voltages of up to 60 V DC. In this way, the resulting size of the switching power supply can be significantly lessened in comparison with forms of embodiment, in which the insulation is effected via an air gap. In such case, the invention offers the advantage that also the increased energy requirement of the light source 13 due to the interposed insulator 31 can be provided by the cooperating voltage regulator 19 and electrical current regulator 21, without having an accompanying large power loss.

Another optional measure is a snubbing capacitor CD, which is arranged in an additional circuit branch 33 connected after the light source 13 and in parallel with the electrical current path 25 extending through the electrical current regulator 21. Capacitor CD effects a fast and effective attenuation of oscillations caused by fluctuations of the output voltage $U_{out}$, such as can occur, for example, from the turn-on of the switching power supply, or suddenly arising, very high loadings and/or very rapidly very greatly changing loadings of the switching power supply.

Figure 2:
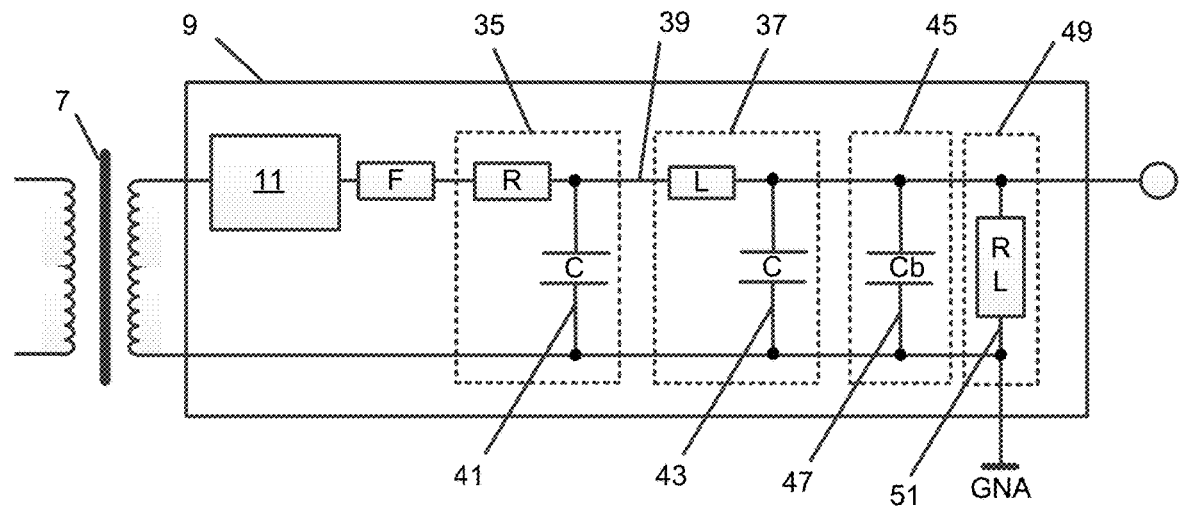
FIG. 2 shows an example of an embodiment of the output circuit of FIG. 1.

Moreover, also the output circuit 9 comprising the rectifier 11 can contain other components. FIG. 2 shows, for example, an embodiment of the output circuit 9, in the case of which an electrical current limiting fuse or circuit breaker F is connected after the rectifier 11 on the secondary side in series branch 39. This increases operational safety in the case of malfunction of an upstream component.

Additionally, a circuit element effecting smoothing of the rectified voltage, such as e.g. an R-C unit 35 and/or an L-C unit 37, can be connected after the rectifier 11. FIG. 2 shows, as an example of this, an R-C unit 35, which comprises, connected after the rectifier 11 in the series branch 39, a resistor R, and, arranged in parallel in a shunt branch 41 connected between the series branch 39 and the secondary side, reference potential GNA, a capacitor C. Connected after the R-C unit 31 is an L-C unit 33, which comprises, connected after the rectifier 11 in the series branch 39, an inductor L, and, arranged in parallel in an additional shunt branch 43 connected between the series branch 39 and the secondary side, reference potential GNA, a capacitor C.

Additionally, the output circuit 9 can optionally be equipped, connected after the rectifier 11, with an energy storer 45. An example of this is shown in FIG. 2 in the form of a buffer capacitor $C_b$ arranged in parallel in an additional shunt branch 47 connecting the series branch 39 with the reference potential GNA.

Moreover, optionally provided connected after the rectifier 11 can be a high-ohm basic load 49, via which excess energy transferred to the secondary side can be expelled. As an example of this, FIG. 2 shows a high resistance load resistor $R_L$ arranged in parallel in an additional shunt branch 51 connected between the series branch 39 and the reference potential GNA. Via this basic load 49, always a basic loading of the switching power supply is assured, when no consumer S is connected to the output or a consumer S connected to the output is drawing no energy.

Figure 3:
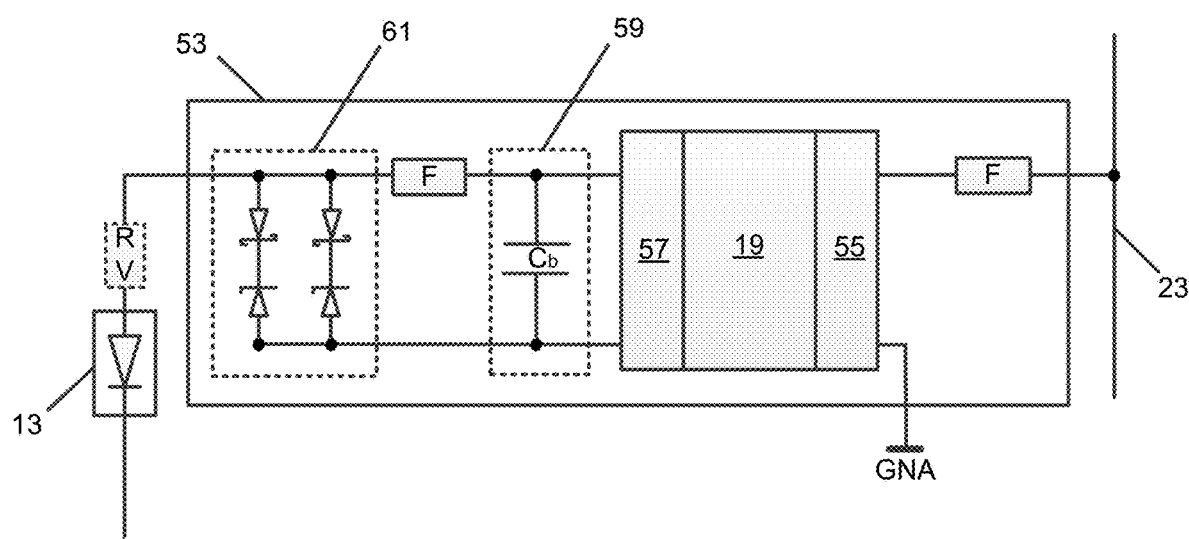
FIG. 3 shows an example of an embodiment of a circuit comprising the voltage regulator of FIG. 1.

Alternatively and/or supplementally to the aforementioned components, other optional components can also be provided in the feedback path. For this, the voltage regulator 19 can, for example, be embodied as a component of a circuit 53 comprising other components. FIG. 3 shows an example of an embodiment of a circuit 53 comprising the voltage regulator 19.

In the circuit 53, an input circuit 55 is connected to the voltage regulator 19 on the input side in front of the voltage regulator 19 and an output circuit 57 is connected to the voltage regulator 19 on the output side behind the voltage regulator 19. Input- and output circuits 55, 57 usable in this way are regularly recommended by the manufacturer of the above example of a voltage regulator 19 and are, consequently, not discussed here in detail.

Exactly as in the output circuit 9 comprising the rectifier 11, also in the circuit 53 comprising the voltage regulator 19, here an energy storer 59 connected after the voltage regulator 19 can be provided. FIG. 3 shows, as an example of this, a buffer capacitor $C_b$, which is provided in a shunt branch connected in parallel with the voltage regulator 19.

Furthermore, the circuit 53 can optionally include a fuse or circuit breaker F connected in front of the voltage regulator 19 and/or a fuse or circuit breaker F connected after the voltage regulator 19.

Moreover, the circuit 53 can optionally include a voltage limiter 61 connected after the voltage regulator 19 for limiting the voltage output from the circuit 53 in the case of a malfunction of one of the components connected upstream from the voltage limiter 61. FIG. 3 shows, as an example of this, a voltage limiter 61 having two shunt branches connected, in each case, in parallel with the voltage regulator 19 and in parallel with one another, wherein, in each case, two diodes, e.g. a Zener diode and a tunnel diode, are provided connected so as to oppose one another.

The invention claimed is:

1. A switching power supply for supplying an output voltage controlled to a desired value, comprising:
   a supply path including a switching controller, a driver configured to control the switching controller, a galvanically-isolating transformer connected after the switching controller, and, connected after the transformer, a rectifier-containing output circuit having an output to which a consumer is connectable; and
   a feedback path including a light source and a light receiver, wherein the light source and the light receiver are configured to feed to the driver a signal corresponding to the output voltage,
   wherein the driver is further configured to control the output voltage to the desired value via a corresponding operation of the switching controller, and
   wherein the feedback path further includes a synchronous buck regulator configured to regulate a supply voltage across the light source to a fixed value below the desired value and further includes an electrical current regulator configured to regulate an electrical current flowing through the light source to an electrical current value corresponding to the output voltage.

2. The switching power supply as claimed in claim 1, further comprising:
   an insulator disposed between the light source and the light receiver, wherein the insulator is transparent in a region to a wavelength of light emitted from the light source.

3. The switching power supply as claimed in claim 2, wherein the insulator is a circuit board.

4. The switching power supply as claimed in claim 2, wherein the insulator has a wall thickness greater than or equal to 0.5 mm, at least in the region through which the light of the light source passes.

5. The switching power supply as claimed in claim 1, wherein the light source includes a light emitting element having a brightness that changes as a function of the electrical current flowing through the light source, and the light receiver includes a light-sensitive element which converts light striking the light-sensitive element into an electrical variable corresponding to a brightness of the light striking the light-sensitive element, the switching power supply further comprising:

a measurement circuit connected to the light receiver and to the driver, wherein the measurement circuit is configured to register the electrical variable, convert the electrical variable into the signal corresponding to the output voltage, and lead the signal to the driver.

6. The switching power supply of claim 5, wherein the light emitting element is an infrared LED.

7. The switching power supply as claimed in claim 1, wherein an input of the voltage regulator is connected with a first tap of a shunt branch connected in parallel with the output of the switching power supply, wherein the first tap lies at a potential of the output voltage, and wherein an output of the voltage regulator is connected, via the light source and an electrical current path extending through the electrical current regulator, with a second tap of the shunt branch connected with a reference potential.

8. The switching power supply as claimed in claim 1, wherein the electrical current regulator includes an input that is connected to a third tap provided in a shunt branch connected in parallel with the output of the switching power supply, wherein the shunt branch includes a two-element voltage divider dividing the output voltage falling across the shunt branch, and the third tap is between the two elements of the voltage divider, and wherein the electrical current regulator is configured to control an electrical current flowing through the light source and on an electrical current path connected after the light source and extending through the electrical current regulator to an electrical current value corresponding to a potential on the input of the electrical current regulator.

9. The switching power supply as claimed in claim 1, wherein the electrical current regulator includes a tunable shunt controller.

10. The switching power supply as claimed in claim 9, wherein the tunable shunt controller is a tunable Zener shunt controller.

11. The switching power supply as claimed in claim 1, wherein the feedback path further includes a circuit branch including a snubbing capacitor, wherein the circuit branch is connected after the light source and in parallel with the electrical current path through the electrical current regulator.

12. The switching power supply as claimed in claim 1, wherein the rectifier-containing output circuit further includes:

a fuse or a circuit breaker connected after the rectifier;

an R-C unit and/or an L-C unit connected after the rectifier and effecting a smoothing of a rectified voltage;

an energy storer including a buffer capacitor connected after the rectifier; and/or a high-ohm basic load connected after the rectifier.

13. The switching power supply as claimed in claim 1, wherein the feedback path further includes:

a limiting resistor connected between an output of the voltage regulator and an input of the light source.

14. A switching power supply for supplying an output voltage controlled to a desired value, comprising:

a supply path including a switching controller, a driver configured to control the switching controller, a galvanically-isolating transformer connected after the switching controller, and, connected after the transformer, a rectifier-containing output circuit having an output to which a consumer is connectable; and a feedback path including a light source and a light receiver, wherein the light source and the light receiver are configured to feed to the driver a signal corresponding to the output voltage, wherein the driver is further configured to control the output voltage to the desired value via a corresponding operation of the switching controller, wherein the feedback path further includes a synchronous buck regulator configured to regulate a supply voltage across the light source to a fixed value below the desired value and further includes an electrical current regulator configured to regulate an electrical current flowing through the light source to an electrical current value corresponding to the output voltage and wherein the voltage regulator is embodied as a component of a circuit that includes an input circuit connected in front of the voltage regulator, an output circuit connected after the voltage regulator, an energy storer including a buffer capacitor connected after the voltage regulator, a fuse or a circuit breaker connected in front of the voltage regulator, a fuse or a circuit breaker connected after the voltage regulator, and/or a voltage limiter connected after the voltage regulator, wherein the voltage limiter includes diodes connected so as to oppose one another.

\* \* \* \* \*